United States Patent [19]

Suzuki

[11] Patent Number: 4,812,917
[45] Date of Patent: Mar. 14, 1989

[54] DEVICE FOR REDUCING DOCUMENT IN SIZE HAVING TWO FACING NON-PARALLEL MIRRORS

[75] Inventor: Shigeru Suzuki, Yokohama, Japan

[73] Assignee: Ricoh Company, Ltd., Tokyo, Japan

[21] Appl. No.: 28,597

[22] Filed: Mar. 20, 1987

[30] Foreign Application Priority Data

| Mar. 20, 1986 | [JP] | Japan | 61-63608 |
| Mar. 25, 1986 | [JP] | Japan | 61-66652 |
| Mar. 26, 1986 | [JP] | Japan | 61-67699 |

[51] Int. Cl.⁴ .......................... H04N 1/10; H04N 1/04; G03G 15/28
[52] U.S. Cl. ..................................... 358/293; 358/285; 358/294; 355/8
[58] Field of Search ............... 358/285, 287, 293, 294; 355/8, 11, 49, 51, 57, 60, 66

[56] References Cited

U.S. PATENT DOCUMENTS

| 3,451,752 | 6/1969 | Frank | 355/8 |
| 3,841,753 | 10/1974 | Ogawa | 355/8 |
| 4,323,307 | 4/1982 | Seeley | 358/293 |
| 4,383,754 | 5/1983 | Kleinschmitt | 355/8 |

FOREIGN PATENT DOCUMENTS

| 58-96453 | 6/1983 | Japan | 358/294 |
| 58-146174 | 8/1983 | Japan | 358/294 |

Primary Examiner—James J. Groody
Assistant Examiner—Randall S. Svihla
Attorney, Agent, or Firm—Oblon, Fisher, Spivak, McClelland & Maier

[57] ABSTRACT

A device for reading in a reduced scale a relatively wide document, e.g., a display board of a graphic input device by projecting an image of the document onto a photoelectric transducer through an image-forming lens. A pair of flat mirrors are provided which consist of a first and a second mirror that are located to face and substantially parallel to each other. A beam is reflected a plurality of times between the mirrors to be propagated toward the lens. Each of the flat mirrors is supported at both of its ends and with its reflective surface oriented substantially vertically. One of the first and second mirrors is inclined relative to the other so that their distance sequentially increases toward the lens. A transparent base plate is provided which has a document transport surface for illuminating the document in a slit configuration. A reflective film is provided on a part of the opposite surface of the base plate to the document transport surface, serving as one of the first and second mirrors.

13 Claims, 9 Drawing Sheets

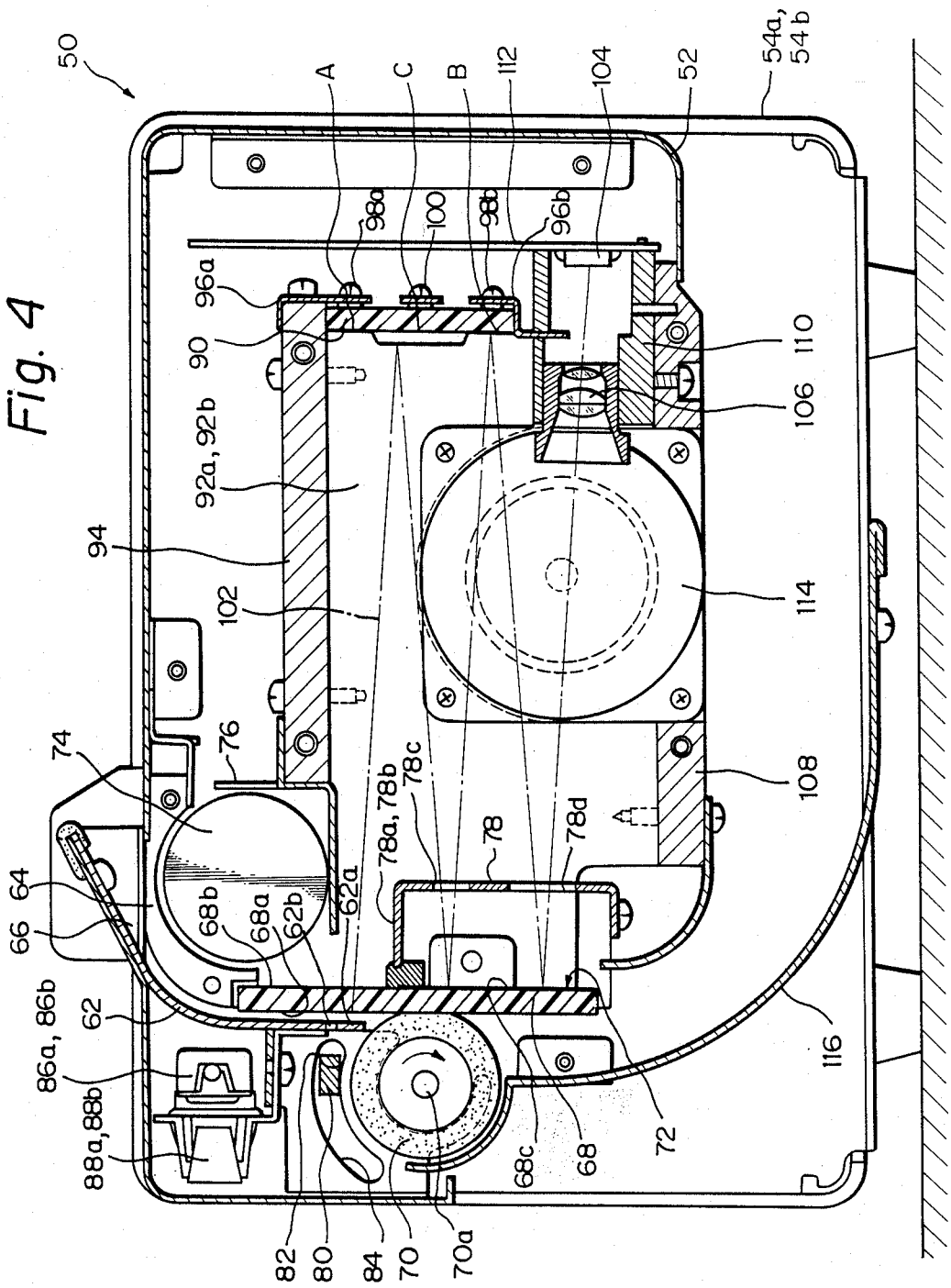

DEVICE FOR REDUCING DOCUMENT IN SIZE HAVING TWO FACING NON-PARALLEL MIRRORS

BACKGROUND OF THE INVENTION

The present invention relates to a device reading in a reducing a document in a reduced size which is suited to produced reduced copies of a relatively wide document, e.g. display board of a graphic input device.

An optical arrangement for a document reading device is available in various configurations. For example, there is known an arrangement including a first mirror which has a reflective surface located to face in an inclined position a glass platen adapted to load a document, a second mirror having a reflective surface which is perpendicular to the glass platen and serving to reflect light from the first mirror, a third mirror having a reflective surface which faces that of the second mirror, a lens mounted on the reflective surface of the third mirror, and a fourth mirror having a reflective surface which faces in an inclined position the surface of a photoconductive element or that of a photosensitive sheet. In this kind of arrangement, the photoconductive element is exposed imagewise to the light from the document on the glass platen by way of the first mirror, second mirror, lens, third mirror, lens, second mirror, and fourth mirror. The second mirror which reflects the light twice is directed to shortening the total length of the optical path defined in the arrangement.

A problem is encountered when it is desired to copy in a reduced size a plan of A0 or A1 size, a white board of a graphic input device or so-called electronic blackboard, and other relatively wide documents, because such documents have to be imaged with a considerable reduction ratio. For example, assume a condition wherein a document which is 27 inches (686 millimeters) wide is to be read by an optical system of the type using a lens having a focal length f of 30 millimeters and a charge coupled device (CCD) having 2048 pixels in total, which are arranged at intervals of 14 microns. In such a condition, the reduction ratio m is expressed as $(2048 \times 14 \times 10^{-3})/686 = 28.672/686$ and, therefore, approximately 1/23.93 (nearly equal to 4.18%). Hence, the distance from the document surface to the CCD imaging surface is as long as $f(1+m)^2/m = 779$ millimeters, resulting in the need for a long optical path. It follows that the optical path cannot be shortened even with the previously stated type of optical arrangement used as such a reducing optical system.

In relation to a reducing and reading optical system as described above, an approach which may be contemplated to cut down the size of the optical system is positioning a pair of flat mirrors in parallel and causing them to reflect a beam a plurality of times therebetween. Such a parallel mirror type scheme, however, requires a great number of structural elements, an extra space for the installation of such structural elements, and the adjustment of the angular positions of the mirrors. It is difficult for the mirrors to be mounted with their flatness maintained. In any cases, compacting the configuration of the entire optical system is impractical.

SUMMARY OF THE INVENTION

It is therefore an object of the present invention to provide a document reducing and reading device with a small and compact optical system.

It is another object of the present invention to provide a document reducing and reading device which, despite the use of a parallel mirror repetitive reflection type principle, is operable with a small-size optical system and without resorting to the adjustment of the angular positions of mirrors, i.e. with the mirrors mounted with accuracy.

It is another object of the present invention to provide a document reducing and reading device which successfully reduces wasteful space to thereby render an optical system small size and compact, while ensuring a condition for an imaging lens to be positioned at a side of parallel mirrors.

It is another object of the present invention to provide a document reducing and reading device capable of maintaining the flatness of elongated mirrors which are included in an optical system.

It is another object of the present invention to provide a generally improved device for reading a document in a reduced size.

A device for reading an image of a document, which is to be reduced in size, by projecting the image in a reduced size onto a photoelectric transducer of the present invention comprises a pair of flat mirrors for reflecting a plurality of times therebetween a beam which is propagated through an optical path extending between the document and the photoelectric transducer, thereby projecting the image in a reduced size, the flat mirror comprising a first mirror and a second mirror which are located to face each other, and an image-forming lens located in an output position where the beam repetitively reflected between the flat mirrors leaves the mirrors.

The above and other objects, features and advantages of the present invention will become more apparent from the following detailed description taken with the accompanying drawings.

BRIEF DESCRIPTION OF THE DRAWINGS

FIG. 4 is a vertical sectioned side elevation of the device as shown in FIG. 3;

DESCRIPTION OF THE PREFERRED EMBODIMENTS

Figure 1:
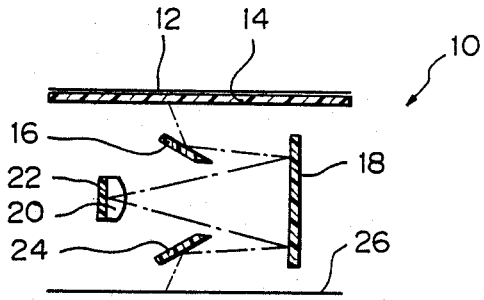
FIG. 1 is a schematic side elevation of an optical system which is included in a prior art document reducing and reading device.
Figure 2:
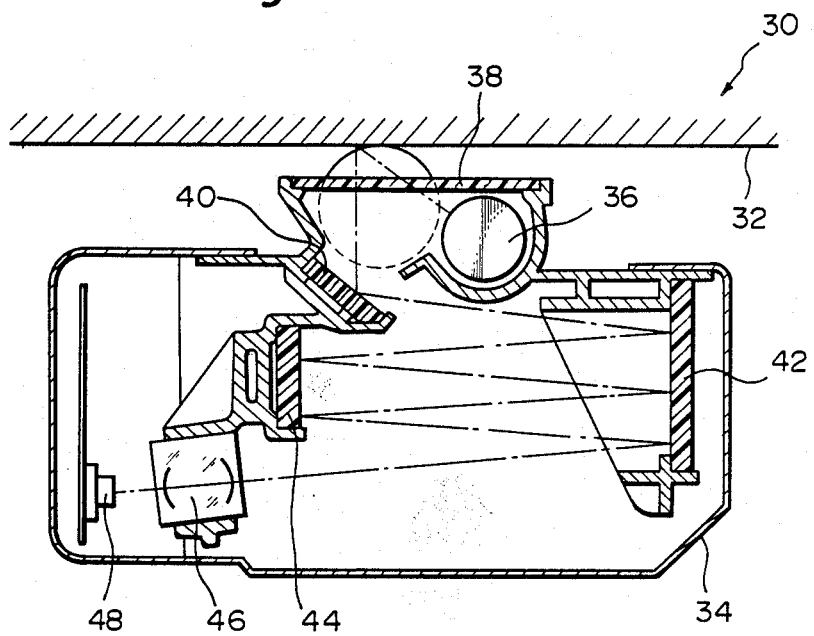
FIG. 2 is a horizontal section of an optical system of another prior art device.

To better understand the present invention, a brief reference will be made to prior art document reducing and reading devices, as shown in FIGS. 1 and 2.

Referring to FIG. 1, a prior art optical arrangement is shown and generally designated by the reference numeral 10. In the arrangement 10, a photosensitive sheet 26 is exposed imagewise to light from a document 12 which is laid on a glass platen 14, whereby a copy of the document 12 is produced with the same size as the document 12. An optical path which intervenes between the glass platen 14 and the sheet 26 as shown is made up of a first mirror 16, a second mirror 18, a lens 20 with a third mirror 22, and a fourth mirror 24, the light from the document 12 being routed through the first mirror 16, second mirror 18, lens 20, second mirror, and fourth mirror 24. The two times of reflection by the mirror 18 is effective to reduce the length of the optical path. However, when it comes to a plan of A0 or A1 size, a white board of a graphic input device and other relatively wide documents, the distance between the document surface and the imaging surface, therefore, the overall length of the optical path is considerably long. In such a condition, the optical path cannot be compressed even with the system 10 of FIG. 1, as previously stated.

Referring to FIG. 2, another prior art optical system is shown which is applicable to a graphic input device. The system, generally 30, includes a movable body 34 which is movable along an input board 32, and a fluorescent lamp 36. The input board 32 is subjected to slit type exposure by the lamp 36 through a dust-proof glass 38. The slit image from the board 32 is reflected by a first mirror 40, then repeatedly reflected by a second and a third mirror 42 and 44, and then focused by a lens 46 onto a CCD 48. The image read by the CCD 48 may be fed to a printer or the like to produce a reduced copy. The repetitive reflection between the parallel mirrors 42 and 44 serves to shorten the overall length of the optical system. Hence, in the case of a digital reduction type copier, the dust-proof glass 38 will be configured as a document transport surface (e.g. glass platen).

The reducing optical system 30 suffers from a drawback that, because the first mirror 40 adapted to receive the light from the board surface (document surface) first and other elements are essential in addition to parallel mirrors (second and third mirrors 42 and 44), the number of structural elements is too great to miniaturize the overall arrangement to a satisfactory degree. In addition, the mounting angle of the mirror 40 has to be adjusted resulting in troublesome assemblage. Should the angular position of the mirror 40 be inaccurate, the inaccuracy would be magnified by the repetitive reflection between the parallel mirrors to lower the reading accuracy.

Another factor which obstructs the miniaturization of the optical system 30 is the image-forming lens 46 which is necessarily located behind the third mirror 44 in order to prevent the block of the lens 46 from intercepting a part of the reflection. If the lens 46 is shifted toward the second mirror 42 to between the second and third mirrors 42 and 44, the document image has to be provided with a substantial angle of incidence to prevent the final beam reflected by the mirror 44 toward the mirror 42 from being intercepted by the lens 46, because the repetitive reflection by the parallel mirrors 42 and 44 occurs at the same angle. However, the substantial angle of incidence as mentioned above would produce a wasteful spaces around the beam in the vicinity of the document (incidence side), eventually limiting the decrease in the size of the optical system.

Figure 3:
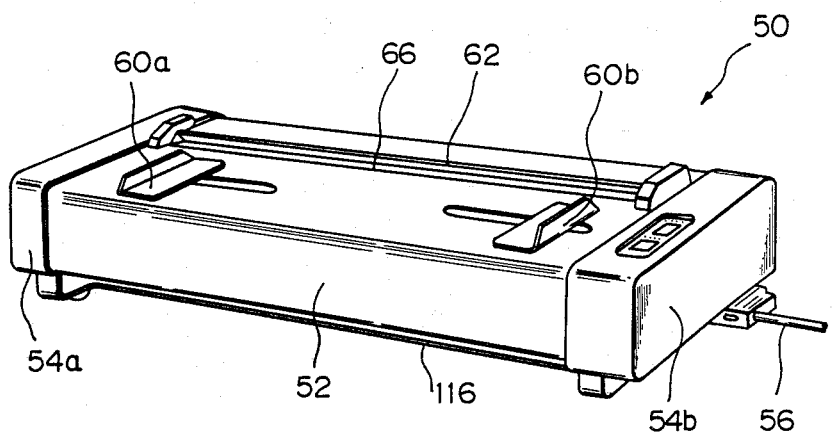
FIG. 3 is an external perspective view of a document reducing and reading device embodying and present invention.

Referring to FIG. 3, a document reducing and reading device in accordance with the present invention is shown which is free from the drawbacks particular to the prior art devices as discussed above. The device, generally 50, has a relatively wide configuration and consists of a housing 52, and covers 54a and 54b each being fixed to one of both sides of the housing 52. The device 50 is connected to a thermal printer or the like, not shown, by a cable 56. Side fences 60a and 60b adapted to guide a document 58 are provided on the top of the housing 52 to be slidable toward and away from each other.

Figure 5:
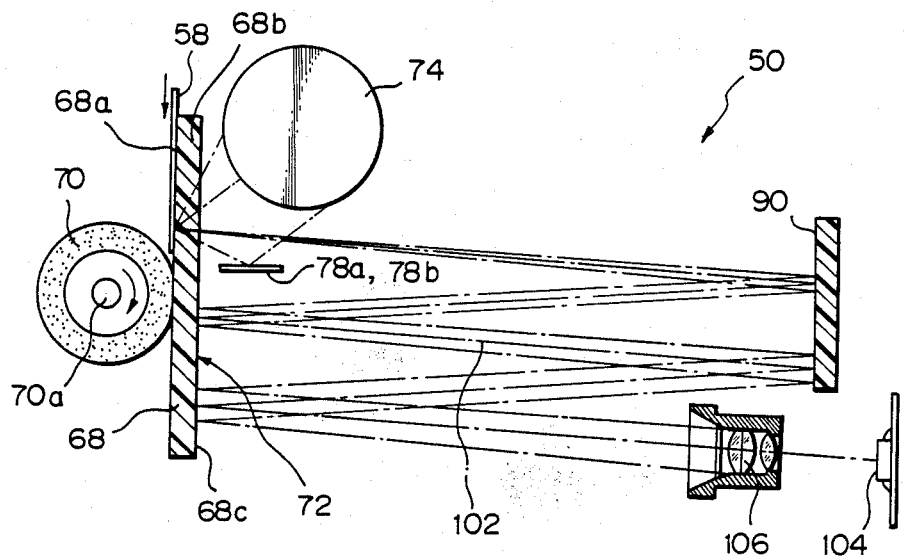
FIG. 5 is a vertically sectioned side elevation showing only the optical system of the device as shown in FIG. 4.

Referring to FIGS. 4 and 5, an arrangement accommodated in the housing 52 and covers 54a and 54b is shown. FIG. 5 shows only the optical system which is included in the arrangement of FIG. 4. A curved document guide plate 62 is provided adjacent to the top of the housing 52 to face a curved guide 64, defining a document inlet 66 in cooperation with the guide 64. The plate 62 serves to guide a document 58 into the device 50 subsequently to the side fences 60a and 60b. A transparent flat base plate 68 is provided in an upright position so as to constitute a transport surface 68a for the document 58 which is inserted along the guide plate 62. A sponge roller 70 is held in pressing contact with the surface 68a of the base plate 68 over a predetermined nip width, so that the document 58 may be transported along the surface 68a. The upper half of the base plate 68 is constituted by a transparent portion 68b, while the lower half of the opposite surface to the roller 70 is provided with a reflective film 68c by the deposition of aluminum. The reflective film 68c serves as a first mirror 72, or flat mirror.

Figure 6:
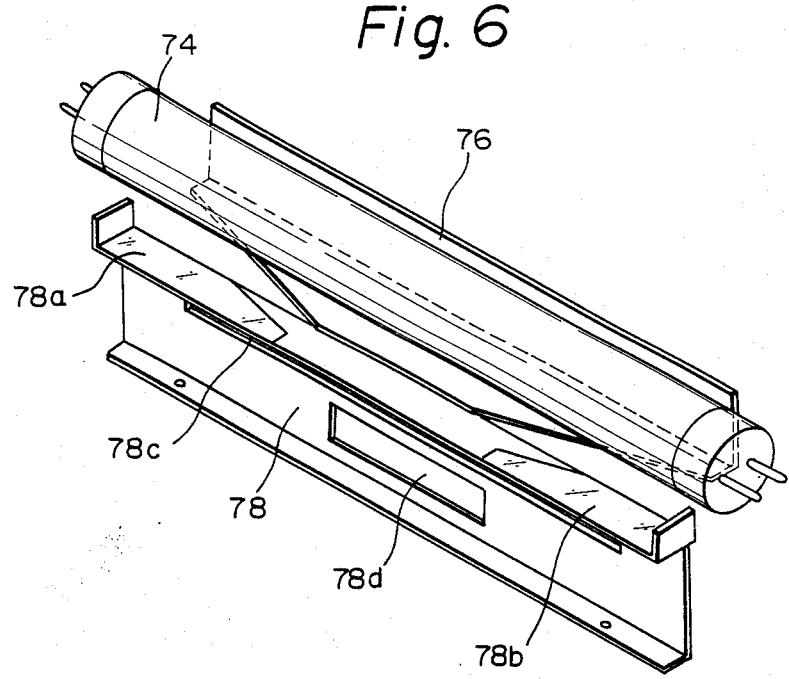
FIG. 6 is a schematic perspective view of a lamp and its neighborhood.

A fluorescent lamp 74 is provided as a light source for illuminating in a slit shape the document which is transported along the surface 68a of and in the transparent portion 68b of the base plate 68. Disposed around the lamp 74 is a slit plate 76 which is so configured as to suppress the amount of exposure in a central area, as shown in FIG. 6. A light intercepting plate 78 having a generally L-shaped cross-section is mounted in such a manner as to cover the first mirror 72. The upper surface of the plate 78 which faces the lamp 74 is provided with a reflective film at each of both sides thereof. Each having a predetermined shape, the reflective films on the plate 78 serve as auxiliary reflective surfaces 78a and 78b for reflecting the light issuing from the lamp 74 toward the document 58. The auxiliary reflective surfaces 78a and 78b are adapted to compensate for the decrease in the amount of peripheral light by the $\cos^4 \theta$ rule of a lens.

The guide plate 62 is provided with a reference white surface 62a in the position where the slit-illumination by the lamp 74 is to occur and, slightly above that position, with an opening 62b. A photosensor 80 is located to face the opening 62b in order to sense the document 58 which is moved toward the slit-illumination position. The photosensor 80 and others are provided as a unit together with the guide plate 62 and rotatable outward, or openable, about a shaft 70a of the roller 70. The rotation of such a guide plate unit is limited by a pin 82 which extends out from the unit and is movably received in arcuate slots 84, which are formed through the covers 54a and 54b. Latches 88a and 88b are respectively engageable with fixing portions 86a and 86b which are provided on the covers 54a and 54b, thereby locking the guide plate unit in a closed position. The fixing portions 86a and 86b may each be implemented with a magnet.

A second mirror, or flat mirror, 90 is positioned parallel to or substantially parallel to and space from the first mirror 72 which is formed on the base plate 68. The second mirror 90, like the first mirror 72, has a reflective surface in an upright position and extends in the widthwise direction of the device 50. In practice, the mirror is 740 millimeters long, 40 millimeters wide (high), and 5 millimeters thick. To achieve a cost-effective construction, the mirror 90 is implemented with, for example, a float glass the surface of which is left non-polished. Gauge plates 92a and 92b identical in configuration are provided at both ends and interconnected by upper and lower (not shown) bars 94 in order to ensure parallelism of the first mirror 72 (base plate 68) and the second mirror 90. Specifically, the second mirror 90 is supported by the gauge plates 92a and 92b at three points. For example, the mirror 90 is supported by the gauge plate 92a in a free state by being pressed thereagainst through bent metal fixtures 96a and 96b by fastening members 98a and 98b which are positioned at support points A and B, respectively. As regards the other gauge plate 92b, the mirror 90 is supported in a free state by being pressed against the plate 92b by a fastening member 100 which is located at an intermediate support point C. The intermediate portion of the mirror 90 which is supported at both ends as stated is in an almost free state and, therefore, may be bent toward the mirror 72 when pressed from the outside.

A turn-back optical path is provided such that the light beam 102 representative of a slit-like image of the document 58 is incident to the mirror 90 at a certain angle, then reflected by the mirror 90 to the mirror 72, then reflected by the mirror 72 back to the mirror 90, and then reflected by the mirror 90 to the mirror 72. Specifically, the light beam 102 is repeatedly reflected a plurality of times (e.g. four times) between the mirrors 72 and 90. The light intercepting plate 78 is provided with slits 78c and 78d. An image-forming lens 106 adapted to focus the final reflection from the mirror 72 onto a photoelectric transducer, or CCD, 104 is mounted together with the CCD 104 on a lower connecting plate 108 as a lens block 110. The lens block 110 is located below the mirror 90 and in a position where it does not interfere with the last reflection 102 from the mirror 90 to the mirror 72. That is, the block 110 is positioned at the opposite side to the document transport surface. The CCD 104 is electrically connected to a printed circuit (PC) board 112. The optical axis of the lens 106 extends perpendicular to the mirrors 72 and 90, i.e. horizontally.

A motor 114 adapted to drive the sponge roller 70 and others is mounted on one of the gauge plates 92a and 92b. Another curved guide 116 is positioned after roller 70 so as to guide the document 58 being discharged.

The operation of the device 50 having the above construction will be described, beginning with an image reading procedure. When a main switch of the device 50, not shown, is closed with no document 58 loaded, the lamp 74 is turned on (40 kHz) to illuminate the reference white surface 62a. The reflection from the white surface 62 is routed to the CCD 104 by the mirror 90, mirror 72 and lens 106, whereby the amount of the reflection is read for a shading correction. Specifically, although the auxiliary reflective surfaces 78a and 78b are used to compensate for the decrease in the amount of light in both end portions of the lamp 74, the compensation is not perfect. This, coupled with the difference in sensitivity between the elements of the CCD 104 and the change in the amount of light of the lamp itself, requires an electrical shading correction as stated above. Namely, the same number of non-uniform outputs as the pixels which are distributed over the entire reading width are read and, then, the gain is controlled on a pixel basis until all the outputs become uniform. Because the amount of light varies with the temperature of the lamp 74, the measurement of the amount of reflected light is repeated at a predetermined intervals or until the temperature of the lap 74 becomes stable. Before such an electrical correction, a mechanical shaping correction is performed with the auxiliary reflective surfaces 78a and 78b to effect the correction without the need for the control over the amount of light issuing from the lamp 74.

On completion of the shading correction with the reference surface 62a, a document 58 is inserted through the inlet 66 into the device 50 which is now ready to read information. In this instant, the document 58 is manipulated to cause its leading end into abutment with the nipping portion of the roller 70, which is held in a halt, so as to correct the skew of the document 58. While document feed rollers or the like are usually installed to feed a document toward a nipping section, this particular embodiment uses only the roller 70 for the sake of simplicity of construction and, hence, one is required to continuously press the document 58 against the nipping section until the roller 70 begins to rotate. As the document 58 is loaded as mentioned above, such is sensed by the photosensor 80 which is responsive to the interception of the light from the lamp 74 by the document 58. After a predetermined period of time has expired since the detection of the document 58, the motor 114 is energized to drive the roller 70 to automatically start a reading operation. If desired, an arrangement may be made such that a start button is manually depressed to start the operation on condition that the document 58 has been sensed.

On the rotation of the roller 70, the document 58 is transported downward at a predetermined rate along the document transport surface 68a. During the transport, the document 58 is illuminated by the lamp 74 through the transparent portion 68b of the base plate 68. A slit-shaped image, or beam 102, reflected by the document 58 is reflected by the second mirror 90, then directed toward the first mirror 72 through the slit 78c, and then reflected by the mirror 72 toward the mirror 90. When reflected again by the mirror 90, the beam 102 is directed through the slit 78d toward the mirror 72 to be reflected thereby. In this manner, the beam 102 is reflected back and forth between the mirrors 90 and 72 and, thereafter, focused in a reduced size on the CCD 104 by the lens 106, thus being digitally read by the CCD 104. As the photosensor 80 senses that the trailing end of the document 58 has moved past the exposure position, the rotation of the roller 70 is stopped awaiting the lapse of a period of time necessary for the document trailing end to move past the nipping section, as counted from the sensed position, plus a period of time a. The device 50 now is ready to receive another document.

Although the document reading position and the nipping position should preferably be one and the same, such would force the roller 70 surface, which is easy to contaminate, to play the role of the reference white surface 62a. For this reason, the reference surface 62a in this embodiment is positioned before the nipping position. Here, the leading end portion of the document 58 which spans the distance between the reading position and the nipping position cannot be read. The guide plane 62 is openable as previously stated to clean the reference white surface 62a and the document transport surface 68a of the base plate 68.

Miniaturization of the optical system which is another aspect of this embodiment will be discussed. Assume that the document 58 is 27 inches (686 millimeters) wide, the inter-pixel distance of the CCD 104 is 14 microns, the total number of pixels is 2048, and the focal length of the lens 106 is 30 millimeters. Then, because the reduction ratio m is 1/23.93 as previously stated in relation to the prior art, the distance between the document 58 and the CCD 104 is 779 millimeters. In this embodiment, the beam 102 for the reduced projection is reflected four consecutive times between the mirrors 72 and 90, meaning that it is folded above five times, so that the distance between the document 58 and the CCD 104 is compressed to about 1/5; in the above specific example, the distance is shortened to about 160 millimeters. Further, in this embodiment, the surface of the base plate 68 which is opposite to the mirror 72 serves as the document transport surface 68a and, at the same time, joins in the illumination of the document through the transparent portion 68b. Hence, the two parallel mirrors 72 and 90 replace the various structural elements heretofore required such as a glass platen for the transportation of a document and an extra mirror for receiving the first reflection. All that is required with the mirrors 72 and 90 is maintaining them parallel to each other, promoting accurate assembly. The parallelism is accomplished by simply abutting the mirrors 72 and 90 against the gauge plates 92a and 92b which are identical in configuration (if desired, the mirror abutment surfaces may be provided directly on the side walls of the device).

The optical axis of the lens 106 may be inclined relative to the mirrors 72 and 90. Nevertheless, because a small angle of inclination suffices, it is not objectionable in practical use to position the lens 106 such that its optical axis is perpendicular to the mirror surfaces, as in this embodiment. The perpendicular relation of the lens 106 to the mirrors enhances the ease of machining fixtures for mounting the lens 106 and CCD 104 as well as the accuracy thereof relative to the parallel mirrors 72 and 90.

In this particular embodiment, the first and second mirrors 72 and 90 which serve as a pair of flat mirrors are so positioned as to have vertical reflective surfaces and, thereby, ensure flatness. Such will be described in detail. Specifically, because the surface accuracy of flat mirrors which are inserted in an imaging optical axis, such as the mirrors 72 and 90, has influence on the imaging performance, the flatless which is one of various characteristics required of, for example, the first and second mirrors will be studied. It should be noted that the word "flatness" used herein pertains to the undulation of the whole surface, as distinguished from a ripple which refers to a surface angle error within a small section. While a reflective mirror for precision optics is produced by polishing a blank of glass or the like to a required degree of flatness, a wide flat mirror for use with a copier whose resolution is of the order of 8 dots per millimeter is often implemented with an unpolished surface of a float glass. In fact, it is desired to use a float glass from the cost standpoint, and even commercially available flat mirrors in general have flatness greater than 200 mR. What is important in mounting a flat mirror to a device is preserving its flatness and, so, a flat mirror is usually supported at three points in order to prevent bending moments from acting on the mirror to deform its surface.

However, when it comes to a flat mirror having a substantial area, the three-point support cannot preserve the flatness particular to the mirror while maintaining the reflective surface of the mirror horizontal, due to the weight of the mirror (the amount of deformation increases in proportion to the third power of the distance between the support points). Providing four or more support points, on the other hand, would result in the need for large-size and accurately machined support members.

Figure 7:
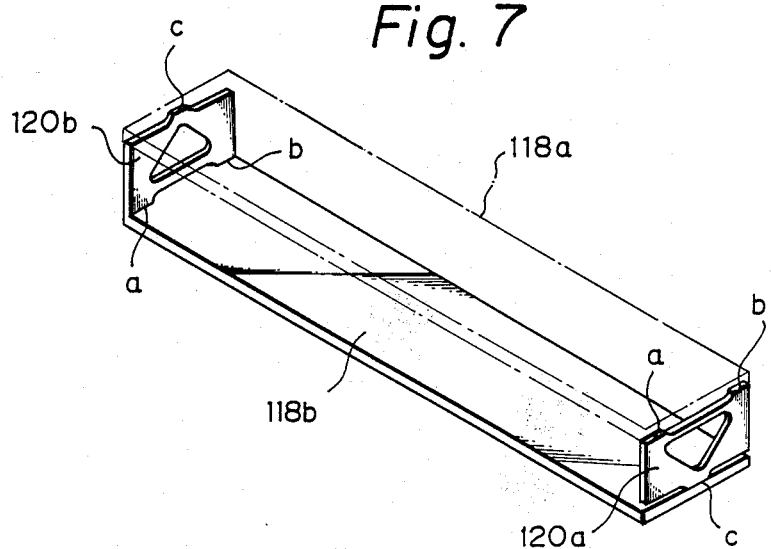
FIG. 7 is a perspective view showing mirrors held in a horizontal position.

The three-point support principle is preferable for an elongate flat mirror such as the mirrors 72 and 90 of the above embodiment, i.e., supporting it at both ends and at the center. However, in the case of an elongate mirror having a substantial longitudinal dimension, the mechanical strength of a support member located at the center of the mirror is apt to become poor and, therefore, has to be provided with a large size. It may be said, therefore, that an elongate flat mirror in practice should preferably be supported at both ends only, i.e., two points at one end and one point at the other end. Such a three-point support system is effectively applicable to a case wherein, as shown in FIG. 7, the elongate flat mirrors 118a and 118b are supported in parallel to each other by the parallel gauge members 120a and 120b. The gauge members 120a and 120b are identical in configuration and produced by the same procedure to have sufficient accuracy. As shown in FIG. 7, the gauge members 120a and 120b are used in opposite orientation to each other, the mirrors 118a and 118b being pressed against lugs, or support points, a, b and c of the members 120a and 120b.

Generally, two different systems are known in the art for supporting a beam at both ends thereof, i.e., a fixed support system which fixes both ends of a beam to support members, and a free support system which simply presses both ends of a beam against support members. It is known that the maximum amount of bending under an equally distributed load condition is five times greater in the case of the free support system than in the case of the fixed support system. Although such implies the preference for the fixed support system, the free support system is more preferable for an elongate mirror than the fixed support system taking account of the difference in coefficient of linear expansion between the material (glass) of the mirrors 118a and 118b and the support members; the fixed support system would adversely affect the flatness in response to temperature variations. When the flat mirror 118a of FIG. 7 having a length l of 740 millimeters, a width b of 40 millimeters and a thickness h of 5 millimeters is held in a horizontal position by the fixed support system at its opposite ends, the maximum amount of bending δ is produced by δ=5Wl³/384EI, where W denotes the weight, I the sectional secondary moment (I=bh³/12), and E the Young's modulus. Here, because I is 416.7, E is 7.94×10⁶ grams per square millimeter, and W is 380 grams, the maximum amount of bending δ is 0.606 millimeter at the center.

In the embodiment shown in FIGS. 3 to 6, assume that the second mirror 90 remote from the document 58 is supported in a horizontal position by the free support system at its both ends and subjected to the above-mentioned bending (the free support system is not applicable to the first mirror 72 because the roller 70 applies pressure thereto). Then, the optical length of the beam 102 at the intermediate between the opposite ends of the mirror 90 is increased by 0.606×4=2.42 millimeters due to the four consecutive times of reflection between the mirrors 72 and 90.

Figure 8:
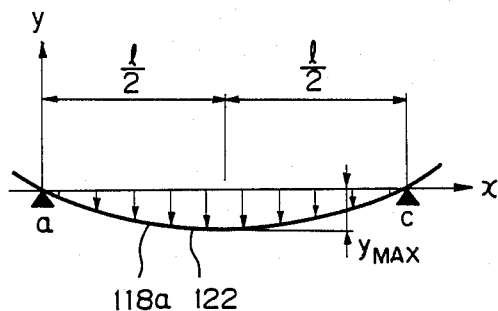
FIG. 8 is a plot showing a line of elasticity under a both-end free support and equally distributed load condition.
Figure 9:
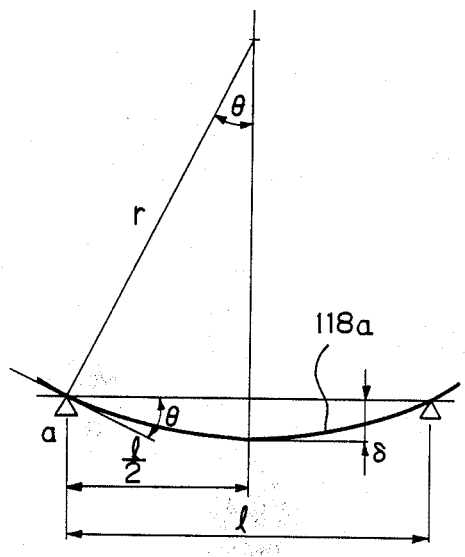
FIG. 9 is a diagram for explaining a radius of an osculating circle.

The above situation will be described in more detail with reference to FIGS. 8 to 10. To begin with, when the flat mirror 118a is supported at its both end by the free support system under an equally distributed load condition, as represented by arrows in FIG. 8, the inclination i of a line of elasticity 122 is expressed as:

$$i = \frac{dy}{dx} = \frac{w}{24\,EI}(4x^3 - 6x^2 + l^3)$$

where w is the weight per length, i.e. W/l.

The radius of curvature p of bending is minimum at the center (l/2), and the angle of inclination i is maximum at both ends, e.g. support points a and c. The maximum angle of inclination $i_{MAX}$ is produced from the numerical conditions of the flat mirror 118a, as follows:

$$i_{MAX} = \frac{dy}{dx} = \frac{Wl}{24\,EI} = 0.00262$$

Hence, the angle θ is produced by θ=tan⁻¹ 0.00262=9'. As shown in FIG. 9, the radius r of an osculating circle whose tangent is the maximum angle of inclination at each end is generally expressed as r=l/2 sin θ. The maximum value $R_{MAX}$ of the radius r is produced by $$R_{MAX} = \frac{l}{2\sin\theta} = \frac{740}{2\sin 0.15°} \approx 141.2\ m$$

In the case of free support system, the radius of curvature at each end is infinite and, therefore, it is reasonable to regard the maximum radius $R_{MAX}$, which is nearly equal to 141.2 meters, as the flatness of each end.

On the other hand, the curvature 1/ρ of the line of elasticity 122 is represented by 1/ρ=d²y/d²x. Assuming that the bending moment is M, there holds an equation:

$$\frac{d^2y}{d^2x} = \frac{M}{EI} = \frac{w}{2\,EI} \times (x - l)$$

Figure 10:
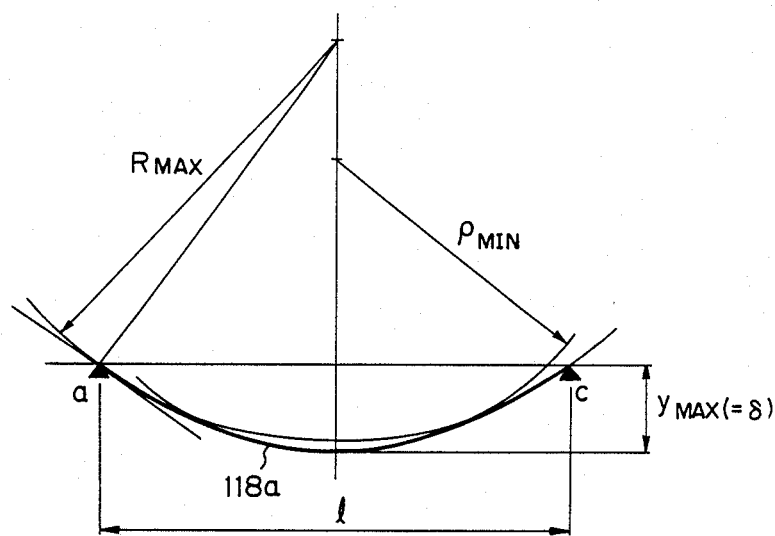
FIG. 10 is a diagram of explaining a radius of curvature.
Figure 11:
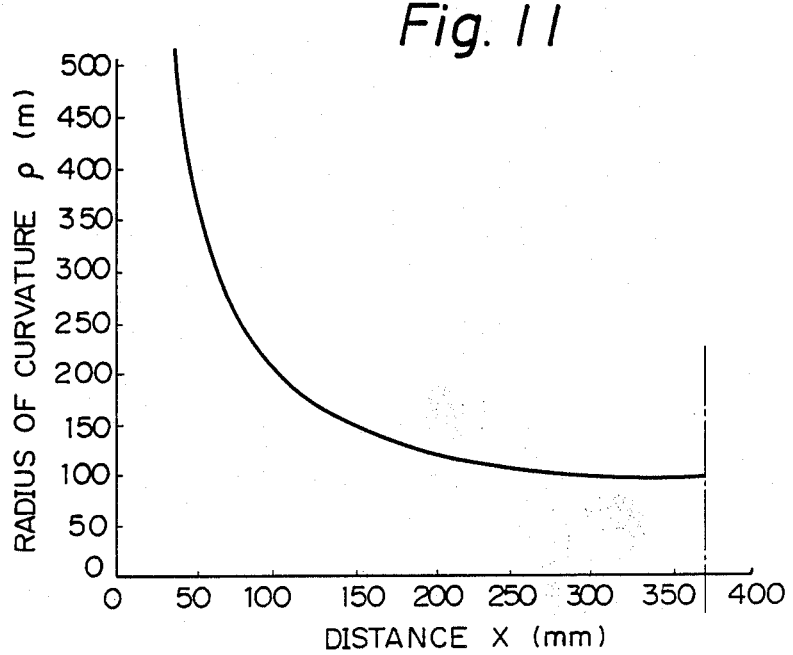
FIG. 11 is a plot showing a relationship between the radius of curvature p and the distance x.

Consequently, as shown in FIG. 10, the radius of curvature $\rho_{MIN}$ at the center which is minimum is $\rho_{MIN}=1/(d^2y/d^2x)$ [when x=l/2]=8EI/wl²=94.13 meters. The radius of curvature ρ and the distance x from the end are related as represented by a curve in FIG. 11. In any case, considering the fact that the flatness of the mirror 118a itself is 200 mR, it will be seen that the radius of curvature $\rho_{MIN}$ which is 94.13 meters means a noticeable decrease in the flatness. This results in an amount of bending δ which is as great as 0.606 millimeters at the center, as previously stated. When such bending occurs between parallel flat mirrors which are adapted for repetitive reflection, the amount of bending is increased by the reflection and reproduced on an imaging device. In this respect, flatness is a critical factor of parallel mirrors.

In this particular embodiment, the mirrors 72 and 90 are each held in a vertical position to eliminate the influence of bending otherwise caused by the weight of each mirror, whereby the flatness of the mirrors is insured. Such will also be understood from the fact that in an equation I=bh³/12, which is representative of a sectional moment I, b is 5 millimeters and h is 40 millimeters and, therefore, I is 2666.7 which is 64 times greater than the attainable with a horizontal position, the amount of bending δ being reduced to 1/64. In this manner, the mirrors 72 and 90 repeat reflection therebetween while being maintained sufficiently flat, promoting desirable imaging operation. In addition, the free support principle applied to both ends of the mirror is simple and cost-effective.

While the embodiment has been shown and described as causing the beam 102 to be turned back four times between the mirrors 72 and 90, it will be apparent that the number of turnbacks may be changed as desired by adjusting the distance between the mirrors and others. By changing the number (angle) of turn-backs so, it is possible to change the reduction ratio stepwise.

Figure 12:
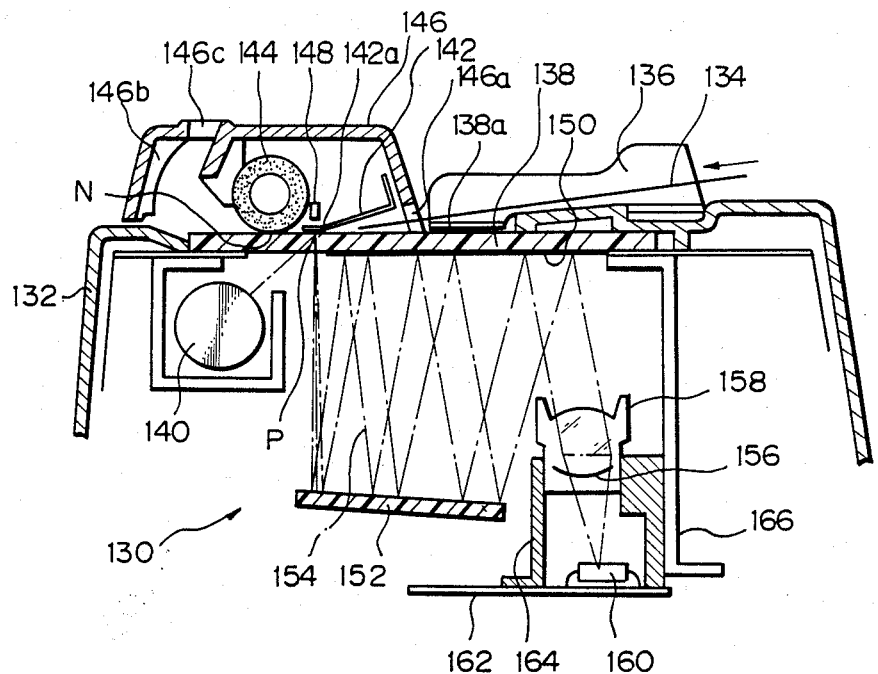
FIG. 12 is a vertically section side elevation of another embodiment of the present invention.

Referring to FIG. 12, a device 130 in accordance with another embodiment of the present invention is shown. As shown, the device 130 includes side fences 136 which are provided on the top of a copier 132 to be movable toward and away from each other. The side fences 136 are adapted to guide a document 134 being inserted into the device 130. A flat transparent base plate 138 is also provided on the top of the copier 132 and has an elongate configuration along the width of the device 130. The upper surface of the base plate 138 serves as a transport surface 138a for the document 134 while the document 134 is guided by the side fences 136 into the device 130. There is defined a reading position P where the document 134 is illuminated through a slit by a fluorescent lamp or like light source 140, which is disposed below the base plate 138. A spring member 142 is provided for pressing the document 134 being inserted in the reading position P against the transport surface 138a. A sponge roller 144 is adapted to transport the document 134 on and along the transport surface 138a. The lower surface of the spring member 142 constitutes a reference white surface 142a. The sponge roller 140 presses itself against the transport surface 138a at a nipping position N downstream of of the reading position P. A cover 146 which accommodates the spring member 142 and roller 144 therein is formed with a document inlet 146a, a guide rib 146b which joins in the discharge of the document 134, and an document outlet 146c. A document sensor 148 is located to face the reading position P so as to sense the insertion of the document 134.

That part of the base plate 138 which is located on the discharge side with respect to the position P is left transparent A reflective film is provided on the underside of the other part of the base plate 138 which is located on the insertion side (that surface which is opposite to the transport surface 138a) by deposition of aluminum. The reflective film serves as a first mirror, or one flat mirror, 150. A second mirror, or the other flat mirror, 152 is disposed in the copier body 132 at a distance from and in parallel to the first mirror 150. The mirror 152, like the mirror 150, is provided with an elongate configuration extending along the width of the device (e.g. 760 millimeters long in a direction perpendicular to the sheet surface). The mirrors 150 and 152 define a turn-back optical path which turns back a plurality of times, e.g., six times a beam 154 which is representative of a slit-like image and reflected from the reading position P. The final reflection from the mirror 150 is routed to an image-forming lens 156. The lens 156 has an optical axis which is perpendicular the horizontal, i.e., to the mirror 150. As shown, the lens 156 is located at a side of the mirrors 150 and 152 so that a lens barrel 158 associated therewith may not interfere with the final reflection from the mirror 152 toward the mirror 150. A CCD 160 is mounted on a PC board 162 to serve as a photoelectric transducer onto which the reflection 154 is to be focused. The lens 156 and CCD 160 are put together to constitute a lens block 164 and mounted on a metal fixture 166.

In operation, when a main switch of the device 130, not shown, is turned on with no document 134 loaded, the light source 140 glows (40 kHz) to illuminate the reference white surface 142a. A reflection from the white surface 142a is focused by the mirrors 150 and 152 and lens 156 on to the CCD 160 which then reads the amount of reflection for the purpose of electrical shading correction. The shading correction which relies on the white surface 142a is necessary partly because of the sensitivity differs from one element to another of the CCD 160, and partly because the amount of light issuing from the lamp itself 140 is not constant. Specifically, the shading correction is such that the same number of non-uniform outputs as the pixels are read over the entire reading width and, then, the gain is controlled on a pixel basis until all the pixel outputs become uniform. Because the amount of light varies with the lamp temperature, the measurement of the amount of reflection is repeated at predetermined intervals or until the temperature of the light source 140 becomes stable.

On completion of the shading correction as stated above, the document 134 is manually inserted through the inlet 146a into the device 130 which now is ready to read formation. In this instance, the document 134 is inserted until its leading end abuts against the nipping position of the sponge roller 144, in order to correct the skew of the document 134. While feed rollers and others adapted to feed a document to a nipping portion are usually used, this particular embodiment uses only the sponge roller 144 to simplify the construction. Hence, it is necessary for one to continuously press the document 134 against the nipping section until the roller 144 begins to rotate. When the document 134 is brought to the predetermined position, the sensor 148 senses it. As a predetermined period of time expires since the detection of the document 134, the roller 144 is driven by a motor, not shown, to automatically start a reading operation. If desired, a start button may be manipulated to start a reading operation on condition that the sensor 148 senses the document 134.

The roller 144 in rotation transports the document 134 along the transport surface 138a of the base plate 138 at a predetermined rate, from the right to the left as viewed in FIG. 12. During the transport, the document 134 is illuminated by the light source 140 at the reading position P of the base plate 138. The resulting slit-like image which is reflected by the document 134 (reflected beam 154) is incident to and reflected by the second mirror 152 and, then, incident to and reflected by the first mirror 150. Such reflection is repeated between the mirrors 150 and 152. Finally, the beam 154 is focused in a reduced size on the CCD 160 by the lens 156, the CCD 160 reading the image digitally. As the passage of the trailing end of the document 134 is sensed by the sensor 148, the rotation of the sponge roller 144 is stopped awaiting the lapse of a period of time for the document trailing end to move past the nipping position N after the reading position P, plus a period of time $\alpha$. The device 130 now is ready to read another document which may be inserted thereinto.

In this embodiment, too, although the reading position and the nipping position should preferably be one and the same, such would force the surface of the roller 144, which is susceptible to contamination, to play the role of the reference white surface. In the light of this, the reference white surface 142a is positioned prior to the nipping position N. Again, the leading end portion of the document which spans the distance between the positions P and N cannot be read. The cover 146 is movable outward, or openable, so that the white surface 142a and the transport surface 138a of the base plate 138 can be cleaned with ease when contaminated.

As regards miniaturization, assume that the document 134 is 27 inches (686 millimeters) wide, the inter-pixel distance of the CCD 160 is 14 microns (8 dots per millimeter in terms of resolution), the total number of pixels of the CCD 160 is 2048, and the focal length of the lens 156 is 24 millimeters. Then, the reduction ratio m is nearly equal to 1/23.93 as previously stated, and the distance between the document 134 and the CCD 160 is 623 millimeters. In this particular embodiment, however, the reflection 154 is reflected six consecutive times between the mirrors 150 and 152 and, therefore, folded about seven times in terms of the number of beams 154. This compresses the distance between the document 134 and the CCD 160 to about 1/7, i.e., to about 89 millimeters in the above specific example.

In this example, the surface of the base plate 138 opposite to the mirror 150 is used as the transport surface 138a while, at the same time, the reading position P is defined in the transparent part of the plate 138 which is not provided with the mirror 150 to thereby use it for the illumination of the document 134 as well. The only two parallel mirrors 150 and 152, therefore, replace a glass platen for the transport of a document and an extra mirror exclusively used to receive the first reflection.

In this particular embodiment, to further promote the miniaturization of the optical system, the second mirror 152 is inclined by an angle $\theta$ such that the distance between the mirrors 150 and 152 sequentially increases as it approaches the lens 156. The effect attainable with such as inclined arrangement is as follows.

Figure 13:
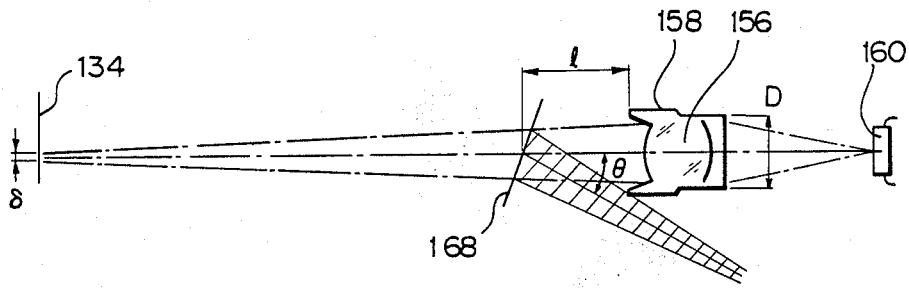
FIG. 13 is a developed view of a reducing optical path.

Assume an optical system for reducing and reading is designed as shown in FIG. 13. For example, assume that the resolution on the document surface is 8 dots per millimeter and the reading width δ is 125 microns in conformity to the reading ability of the CCD 160, the focal length f of the lens 156 is 24 millimeters, the F number is 4, and the outside diameter D of the lens barrel 158 is 14 millimeters. Under this condition, the minimum angle of incidence θ is decided on the basis of the distance l between the final reflection surface 168 and the lens 156 in order to prevent the final reflection from interfering with the lens barrel 158.

Figure 14:
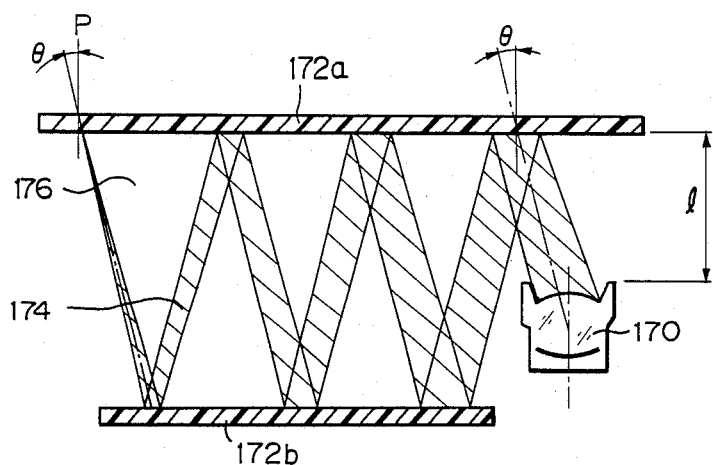
FIG. 14 is a schematic side elevation showing a reflection condition between parallel mirrors.
Figure 15:
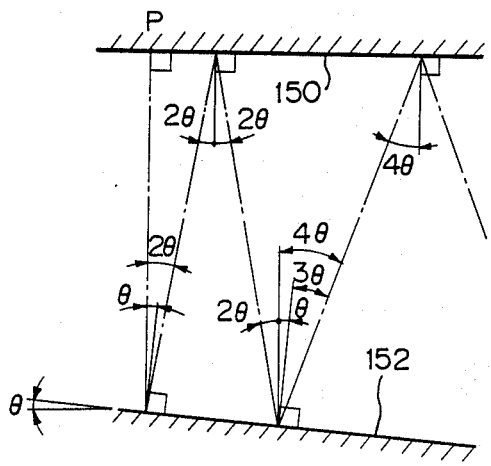
FIG. 15 is a schematic diagram representative of how an angle of reflection is sequentially increased.

The arrangement wherein the lens 170 is located at a side of flat mirrors which are adapted to reflect a beam a plurality of times under the above condition may be implemented with parallel flat mirrors 172a and 172b, as shown in FIG. 14. However, a drawback with such a scheme is that, because the angle of reflection is θ which is constant, the distance between nearby reflecting positions is substantial although the beam 174 is narrower on the position P side (image put side), as indicated by hatching in FIG. 14. The result is an increase in wasteful spaces 176 other than the hatched areas and, therefore, a need for more than a necessary length in the right-left direction as viewed in FIG. 14, obstructing the miniaturization of the optical system.

Figure 16:
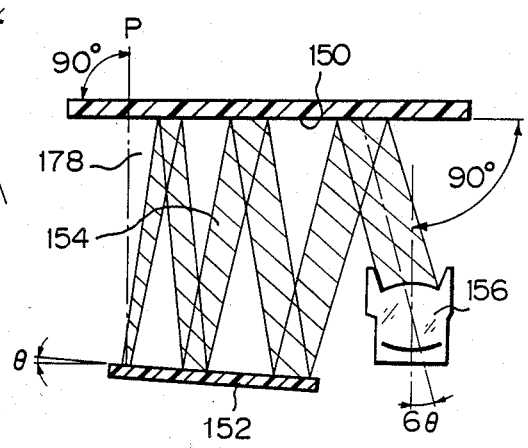
FIG. 16 is a view showing refection of a beam.

In this particular embodiment, because the second mirror 152 is inclined by θ relative to the horizontal, a beam directed vertically from the reading position P toward the mirror 152 is reflected toward the mirror 150 at an angle of reflection of 2θ relative to the vertical. Then, the mirror 150 which is horizontal reflects the beam at the angle of reflection of 2θ. This beam reflected from the mirror 150 to the mirror 152 is expanded to an angle of reflection of 3θ by the inclination θ of the mirror 152 and reflected thereby at an angle of 4θ relative to the vertical toward the mirror 150. Such reflection is repeated until the final reflection from the mirror 150 is directed toward the lens 156 at an angle of 6θ relative to the vertical, as shown in FIG. 16. This angle, 6θ, corresponds to the angle θ of FIGS. 13 and 14 and is the condition for the lens barrel 158 to be located at a side of the mirrors 150 and 152 without interfering with the final reflection, which is directed from the mirror 152 to the mirror 150.

Despite the unique position of the lens 156 as stated above, the angle of reflection of the beam 154 is smaller and, therefore, the distance between nearby reflecting points is shorter on the image input side, as represented by hatched areas in FIG. 16. This reduces a wasteful spaces 178 other than the hatched areas, shortens the required length of each mirror 150 or 152 in the right-left direction as viewed in FIG. 16, and thereby facilitates miniaturization of the optical system. While the ideal angle with respect to the document surface is 6θ due to the six times of repeated reflection, the angle of 90 degrees as in this embodiment is not objectionable partly because the angle θ is small from the start and partly because the reading width δ at the reading position P is as narrow as 125 microns. Further, although the optical axis of the lens 156 may be inclined to match it to the angle of reflection 6θ, because the angle 6θ is very small, the lens 156 in practice can be mounted perpendicular to the horizontal mirror 150 as in this embodiment. This allows fixtures which are interposed between the mirrors 150 and 152 (inclusive of the CCD 160) for mounting optical elements to be machined with accuracy due to the right-angled configuration. Therefore, what needs consideration in the event of assemblage is only the adjustment of the mirror 152 which is inclined.

Figure 17:
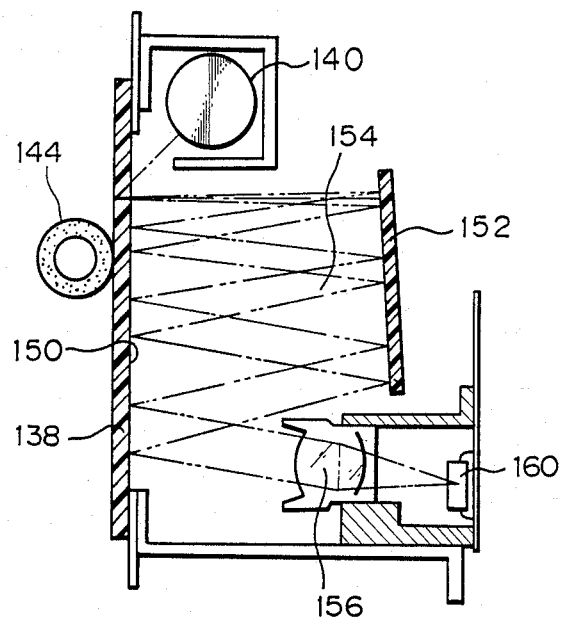
FIG. 17 is a side elevation showing a modification to a vertical arrangement of mirrors.
Figure 18:
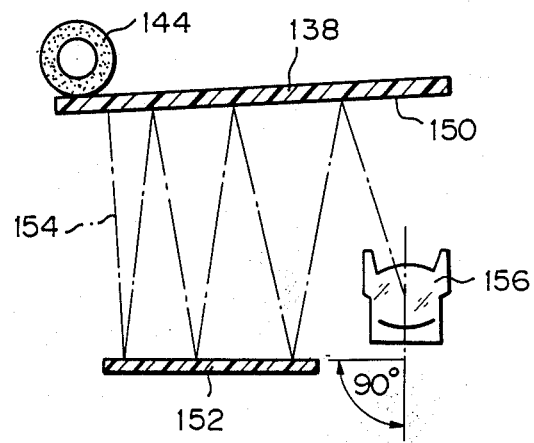
FIG. 18 is a side elevation showing a modification to a horizontal arrangement of mirrors.

In this particular embodiment, each of the mirrors 150 and 152 is held in a substantially horizontal position. Alternatively, as shown in FIG. 17, the mirrors 150 and 152 may be individually provided with a substantially vertical position and inclined to sequentially vary their distance. Further, as shown in FIG. 18, the mirror 150 (base plate 138) on the document side may be inclined by θ with the other mirror 152 held horizontal.

While this embodiment has seen shown and described as causing six times of reflection between the mirrors 150 and 152, the number is variable as desired by adjusting the distance between the mirrors 150 and 152 and others, changing the reduction ratio stepwise.

In summary, it will be seen that in accordance with the present invention an optical path which is turned back a plurality of times is defined between a first and a second mirror, and a transparent base plate on which the first mirror is provided allows its transparent portion serves as a document transport surface. This eliminates the need for various structural elements, other than two mirrors, heretofore installed in an optical system and, thereby, shortens the total optical path. The two mirrors can be mounted with accuracy simply by maintaining them parallel to each other, i.e., without restorting to adjustment of angles.

Also, in accordance with the present invention, a pair of mirrors adapted to sequentially reflect a beam therebetween toward an image-forming lens are provided to face and substantially parallel to each other, the distance between the mirrors sequentially increasing as it approaches the lens. Hence, the configuration is miniaturized in the facing direction of the mirrors while satisfying a condition for the lens to be located at a side of the mirrors without interfering with a beam. In addition, wasteful spaces otherwise brought about by the repeated reflection are reduced to further promote the miniaturization of the optical system.

Further, in accordance with the present invention, because a beam is turned back a plurality of times between a pair of substantially parallel flat mirrors, the optical system can be reduced in size. Each of the flat mirrors is supported at both ends thereof and positioned such that its reflective surface extends substantially vertically, so that the mirror can be maintained flat with no regard to its length by preventing it from being bent due to gravity and, hence, a desirable imaging ability is achieved. Even such a mirror support arrangement can be implemented at low cost.

Various modifications will become possible for those skilled in the art after receiving the teachings of the present disclosure without departing from the scope thereof.

What is claimed is:

1. A device for reading an image of a document, which is to be reduced in size, by projecting said image in a reduced size onto a photoelectric transducer, comprising;

a pair of flat mirrors for reflecting a plurality of times therebetween a beam which is propagated along an optical path extending between said document and said photoelectric transducer, said pair of flat mirrors comprising a first mirror and a second mirror which are located to face each other; and an image-forming lens located in an output position where said beam repetitively reflected between said flat mirrors leaves said mirrors, said lens projecting said beams onto said photoelectric transducer in a reduced size;

said first and second mirrors being slightly inclined relative to a parallel relationship thereof such that a distance between said mirrors is greater at said output position than at an input position where said beam arrives at said mirrors.

2. A device as claimed in claim 1, further comprising support means for supporting longitudinally-opposite ends of said flat mirrors.

3. A device as claimed in claim 2, wherein said flat mirrors are so positioned as to have reflective surfaces thereof being oriented substantially vertically.

4. A device as claimed in claim 1, further comprising a flat transparent base plate which has a document transport surface where said document is subjected to slit-type illumination.

5. A device as claimed in claim 4, wherein said first mirror comprises a reflective film which is provided on a part of a surface of said transparent base plate opposite to said document transport surface.

6. A device for reading an image of a document, which is to be reduced is size, by projecting said image in a reduced size onto a photoelectric transducer, comprising:
a pair of flat mirrors for reflecting a plurality of times therebetween a beam which is propagated along an optical path extending between said document and said photoelectric transducer, said pair of flat mirrors comprising a first mirror and a second mirror which are located to face each other;
an image-forming lens located in an output position where said beam repetitively reflected between said flat mirrors leaves said mirrors, said lens projecting said beam onto said photoelectric transducer in a reduced size; and
support means for supporting longitudinallyopposite ends of said flat mirrors;
said first and second mirrors being slightly inclined relative to a parallel relationship thereof such that a distance between said mirrors is greater at said output position than at an input position where said beam arrives at said mirrors.

7. A device as claimed in claim 6, wherein said flat mirrors are so positioned as to have reflective surfaces thereof being oriented substantially vertically.

8. A device as claimed in claim 6, further comprising a flat transparent base plate which has a document transparent surface where said document is subjected to slit-type illumination.

9. A device as claimed in claim 8, wherein said first mirror comprises a reflective film which is provided on a part of a surface of said transparent base plate opposite to said document transport surface.

10. A device for reading an image of a document which is to be reduced in size, by projecting said image in a reduced size onto a photoelectric transducer, comprising:
a pair of flat mirrors for reflecting a plurality of times therebetween a beam which is propagated along an optical path extending between said document and said photoelectric transducer, said pair of flat mirrors comprising a first mirror and a second mirror which are located to face each other;
an image-forming lens located in an output position where said beam repetitively reflected between said flat mirrors leaves said mirrors, said lens projecting said beam onto said photoelectric transducer in a reduced size; and
a flat transparent base plate which has a document transport surface where said document is subjected to slit-type illumination;
said first mirror comprising a reflective film which is provided on a pair of a surface of said transparent base plate opposite to said document transport surface.

11. A device as claimed in claim 10, further comprising support means for supporting longitudinally-opposite ends of said flat mirrors.

12. A device as claimed in claim 10, wherein said flat mirrors are so positioned as to have reflective surfaces thereof being oriented substantially vertically.

13. A device as claimed in claim 10, wherein said first and second mirrors are slightly inclined relative to a parallel relationship thereof such that a distance between said mirrors is greater at said output position than at an input position where said beam arrives at said mirrors.

* * * * *